United States Patent Office 3,377,371
Patented Apr. 9, 1968

3,377,371
TRIS-SILOXY ACRYLIC SILANES
George J. Quaal, Midland, Mich., assignor to Dow Corning Corporation, Midland, Mich., a corporation of Michigan
No Drawing. Filed Sept. 3, 1964, Ser. No. 394,355
8 Claims. (Cl. 260—448.2)

ABSTRACT OF THE DISCLOSURE

Tris-siloxy acrylic silanes are disclosed which are useful per se or particularly when polymerized as water repellents for fibrous and masonry substrates.

This invention relates to tris-siloxy acrylic silanes. More specifically, this invention relates to silanes having the general formula $$(R_3SiO)_3Si-R'-OOCC(R'')=CH_2$$

wherein R is a member selected from the group consisting of the hydrogen atom, methyl, ethyl, vinyl and 3,3,3-trifluoropropyl radicals, R' is an alkylene radical, and R'' is a member selected from the group consisting of the hydrogen atom, methyl and ethyl radicals.

The silanes of this invention are produced by the cohydrolysis of $CH_2=C(R'')COO-R'-SiX_3$ and an excess of $R_3SiX$.

In the above formulae, X represents a hydrolyzable group. Thus, X can be, for example, an alkoxy group such as a methoxy, ethoxy, propoxy, isopropoxy or a butoxy group; a halogen atom such as chlorine, bromine or an iodine atom; an acyloxy group such as a formyloxy, acetoxy or a propionoxy group; or a $-OCH_2CH_2OCH_3$, $-OCH_2CH_2OCH_2CH_3$ or a $-OCH_2CH_2OH$ group. Preferably, X is a methoxy group or a chlorine atom.

R' in the above formulae can be any alkylene radical. It is preferable, however, that R' contain from 1–4 carbon atoms. Thus, while it is preferable that R' be a $-CH_2-$, $-CH_2CH_2-$, $-CH_2CH_2CH_2-$, $-CH_2CH(CH_3)-$, $-(CH_2)_4-$ or a $-CH_2CH(CH_3)CH_2-$ radical, it can contain six, eight, ten, twelve or more carbons if so desired. The most preferred R' radicals are $-CH_2CH_2CH_2-$ and $-CH_2CH(CH_3)CH_2-$.

The preferred method of preparing the compounds of this invention at the present time comprises slowly adding a mixture of the reactants to a water-solvent mixture with agitation.

The amount of water employed is not particularly critical except that enough should be employed for the hydrolysis reaction to proceed at a satisfactory rate.

While the use of a solvent is not essential to the process, it is desirable to use a solvent in order to obtain a low reflux temperature, to improve the solubility of the product and to help separate the product from any hydrohalic acid that may be produced. Ether is a particularly useful solvent for the reaction, but any other suitable solvent can be employed. For example, heptane, carbon tetrachloride, or benzene could also be used.

The compounds of this invention are useful per se as water repellents for fibrous and masonry materials, or they can first be polymerized and then used as water repellents for such materials. The latter method is preferred at this time. They are also useful for modifying organic polymers prepared from unsaturated organic monomers since they will readily copolymerize with such monomers.

In order that those skilled in the art can better understand how the present invention can be practiced, the following examples are given by way of illustration and not by way of limitation.

Example 1

To a three-necked 5000 ml. flask equipped with a stirrer, a reflux condenser and a dropping funnel, there was added 512 ml. of water and 500 ml. of ether. A mixture of 248 g. of $$CH_2=C(CH_3)COO(CH_2)_3Si(OCH_3)_3$$

325.5 g. of $(CH_3)_3SiCl$ and 312 g. of $(CH_3)_3SiOCH_3$ was placed in the dropping funnel. The stirrer was started and then addition of the mixture to the water and ether started. The rate of addition was about 8.9 g. per minute. At the end of the addition, the temperature of the material in the flask had risen to about 50° C. The reactants were allowed to stir overnight. The following day the water was removed from the mixture in the flask employing a separatory funnel and then the remainder of the contents of the flask were washed four times with water to remove the HCl produced by the reaction. The ether was then separated, under vacuum, from the crude product by passing the crude material through a Buechner funnel on a suction flask. About 600–700 ml. of crude material remained. This crude material was placed in a one liter pot and distilled under vacuum. About 194 ml. of $[(CH_3)_3SiO]_3Si(CH_2)_3OOCC(CH_3)=CH_2$ was obtained at 112°–115° C. and 0.2 mm. of mercury pressure. Analysis of the product for percentage composition was in agreement with its formula and as follows:

Theoretical: Si, 26.5%; C, 45.5%; H, 9.0%. Found: Si, 26.39% and 26.27%; C, 45.63 and 45.65%; H, 9.00 and 8.78%.

Example 2

The procedure of Example 1 was repeated except a mixture of 248 g. of $$CH_2=C(CH_3)COO(CH_2)_3Si(OCH_3)_3$$

and 517 g. of $H(CH_3)_2SiCl$ was placed in the dropping funnel. The rate of addition was about 9 g. per minute. At the end of the addition, the temperature of the materials in the flask had risen to about 45° C. Stirring was continued until the pot cooled at 27° C., then the water removed and the remaining mixture washed four times with water to remove all the HCl formed. The ether was then removed as before. The crude material was placed in a one liter pot and distilled under vacuum employing a Vigreaux column. About 129 ml. of $$[H(CH_3)_2SiO]_3Si(CH_2)_3OOCC(CH_3)=CH_2$$

was obtained at about 115° C. and 0.1 mm. of mercury pressure.

Example 3

A mixture of 8 g. of $$[(CH_3)_3SiO]_3Si(CH_2)_3OOCC(CH_3)=CH_2$$

8 g. of benzene and 0.04 g. of Vazo initiator (azobisisobutyronitrile) was placed in a 20 ml. vial, capped and then placed in a 50°–60° C. steam bath oven for about 12 hours which caused the silane to polymerize.

Cotton print cloth (80 x 80) was padded on a Butterworth Laboratory Padder with a solution consisting of 120 ml. of perchloroethylene, 7 g. of the polymer solution prepared above and 0.5 g. of a curing catalyst $H_2NCH_2CH_2NH(CH_2)_3Si(OCH_3)_3$ so that a 1.5–2% pickup of polymer solids was obtained. After padding, the cloth was air dried and then cured at about 150° C. for three minutes. The cloth was then spray tested for water repellancy employing AATCC Test No. 22–1961. The cloth had a initial spray rating of 100, the highest possible rating.

The above procedure was repeated except that the silane of Example 2 was used instead of the silane of Example 1. The cloth treated with a polymer of this material had an initial spray rating of 80.

Example 4

When the silane mixtures specified below are cohydrolyzed by the procedure of Example 1, the indicated product is obtained.

| Silane Mixture | Product |
|---|---|
| $CH_2=CHCOO(CH_2)_3Si(OCH_3)_3$<br>$(CH_3)_3SiCl$ | $[(CH_3)_3SiO]_3Si(CH_2)_3OOCCH=CH_2$ |
| $CH=C(C_2H_5)COOCH_2Si(OC_2H_5)_3$<br>$(C_2H_5)_3SiBr$<br>$(C_2H_5)_3SiOC_2H_5$ | $[(C_2H_5)_3SiO]_3SiCH_2OOCC(C_2H_5)=CH_2$ |
| $CH_2=C(CH_3)COOCH_2CH(CH_3)CH_2Si[OCH(CH_3)_2]_3$<br>$CH_2=CH(CH_3)_2SiOCH_2CH_2OCH_3$<br>$CH_2=CH(CH_3)_2SiCl$<br>$CH_2=C(CH_3)COO(CH_2)_3Si(OC_4H_9)_3$<br>$CF_3CH_2CH_2(CH_3)SiI$ | $[CH_2=CH(CH_3)_2SiO]_3SiCH_2CH(CH_3)-CH_2OOCC(CH_3)=CH_2$<br>$[CF_3CH_2CH_2(CH_3)_2SiO]_3Si(CH_2)_3-OOCC(CH_3)=CH_2$ |
| $CH_2=CHCOO(CH_2)_4Si(OCH_3)_3$<br>$(CH_3)_3SiOCH_2CH_2OH$<br>$(CH_3)_3SiCl$ | $[(CH_3)_3SiO]_3Si(CH_2)_4OOCCH=CH_2$ |
| $CH_2=C(CH_3)COO)CH_2)_6Si(OCH_3)_3$<br>$H(C_2H_5)_2SiOOCCH_3$<br>$CH_2=C(CH_3)COO(CH_2)_3Si(OCH_3)_3$<br>$CH_2=CH(CH_3)_2SiOCH_3$<br>$CH_2=CH(CH_3)_2SiCl$ | $[H(C_2H_5)_2SiO]_3Si(CH_2)_6OOCC-(CH_3)=CH_2$<br>$[CH_2=CH(CH_3)_2SiO]_3Si(CH_2)_3OOCC-(CH_3)=CH_2$ |
| $CH_2CHCOO(CH_2)_3Si(OCH_3)_3$<br>$H(CH_3)_2SiOCH_3$ | $[H(CH_3)_2SiO]_3Si(CH_2)_3OOCCH=CH_2$ |

That which is claimed is:

1. A silane having the general formula

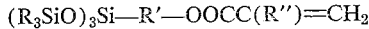

$$(R_3SiO)_3Si-R'-OOCC(R'')=CH_2$$

wherein:
R is a member selected from the group consisting of the hydrogen atom, methyl, ethyl, vinyl, and 3,3,3-trifluoropropyl radicals,
R' is an alkylene radical, and
R" is a member selected from the group consisting of the hydrogen atom, methyl and ethyl radicals.

2. A silane of claim 1 wherein R' contains from 1–4 carbon atoms.

3. The silane

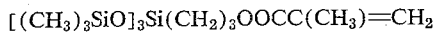

$$[(CH_3)_3SiO]_3Si(CH_2)_3OOCC(CH_3)=CH_2$$

4. The silane $$[H(CH_3)_2SiO]_3Si(CH_2)_3OOCC(CH_3)=CH_2$$

5. The silane $$[CH_2=CH(CH_3)_2SiO]_3Si(CH_2)_3OOCC(CH_3)=CH_2$$

6. The silane $[CF_3CH_2CH_2(CH_3)_2SiO]_3Si(CH_2)_3-OOCC(CH_3)=CH_2$.

7. The silane $[(CH_3)_3SiO]_3Si(CH_2)_3OOCCH=CH_2$.

8. The silane $[H(CH_3)_2SiO]_3Si(CH_2)_3OOCCH=CH_2$.

References Cited

UNITED STATES PATENTS 2,922,807  1/1960  Merker _____ 260—448.2
3,317,369  5/1967  Clark et al. _____ 161—193 X

OTHER REFERENCES

S. Fordham: "Silicones," George Newnes Ltd. (1960), p. 233.

TOBIAS E. LEVOW, *Primary Examiner*.

J. PODGORSKI, *Assistant Examiner*.